United States Patent
Smith et al.

(10) Patent No.: US 10,975,753 B2
(45) Date of Patent: Apr. 13, 2021

(54) EXHAUST GAS RECIRCULATION WIDE RANGE AIR FUEL SENSOR FOR RICH EQUIVALENCE RATIO TARGET RATIONALITY DIAGNOSTIC

(71) Applicant: GM Global Technology Operations LLC, Detroit, MI (US)

(72) Inventors: Michael A. Smith, Clarkston, MI (US); Martino A. Casetti, Clarkston, MI (US); Michael Kaczmar, Farmington Hills, MI (US); Scott R. Jeffrey, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 16/526,357

(22) Filed: Jul. 30, 2019

(65) Prior Publication Data

US 2021/0033016 A1    Feb. 4, 2021

(51) Int. Cl.
*F01N 3/00* (2006.01)
*F01N 11/00* (2006.01)
*F02D 41/00* (2006.01)

(52) U.S. Cl.
CPC ........ *F01N 11/007* (2013.01); *F02D 41/0077* (2013.01); *F01N 2900/1624* (2013.01)

(58) Field of Classification Search
CPC .......... F01N 11/007; F01N 2900/1624; F02D 41/0077; F02D 41/0047
See application file for complete search history.

(56) References Cited

U.S. PATENT DOCUMENTS

| | | | |
|---|---|---|---|
| 5,386,695 A * | 2/1995 | Iwata | F01N 11/007 60/276 |
| 9,650,981 B1 * | 5/2017 | Large | F02M 35/1038 |
| 10,704,504 B1 * | 7/2020 | Smith | F02M 26/01 |
| 2001/0013221 A1 * | 8/2001 | Suzuki | F02D 41/123 60/285 |
| 2002/0011068 A1 * | 1/2002 | Kako | F01N 11/007 60/285 |
| 2005/0115225 A1 * | 6/2005 | Surnilla | F02D 41/0235 60/285 |
| 2011/0265771 A1 * | 11/2011 | Banker | F02D 41/0087 123/564 |
| 2011/0289904 A1 * | 12/2011 | Miyashita | F02D 41/126 60/278 |
| 2015/0107554 A1 * | 4/2015 | Packard | F02D 41/1441 123/350 |
| 2020/0182179 A1 * | 6/2020 | Qi | F02D 41/1454 |

* cited by examiner

Primary Examiner — Matthew T Largi

(57) ABSTRACT

A method for operating an exhaust gas recirculation system using rationality diagnostics for an automobile vehicle includes: estimating an oxygen storage content (OSC) of a catalytic converter of a vehicle; comparing an amount of oxygen stored in the catalytic converter to an OSC threshold; initiating a closed oxygen storage control (COSC) event for a predetermined one of multiple cylinders of an engine of a vehicle if the OSC threshold is met or exceeded, the COSC event targeting a rich air-fuel equivalence ratio (EQR) for the predetermined one of the multiple cylinders; and directing a fuel injector communicating with the predetermined one of the multiple cylinders to operate the predetermined one of the multiple cylinders at the rich EQR.

15 Claims, 3 Drawing Sheets

EXHAUST GAS RECIRCULATION WIDE RANGE AIR FUEL SENSOR FOR RICH EQUIVALENCE RATIO TARGET RATIONALITY DIAGNOSTIC

The present disclosure relates to vehicle exhaust gas recirculation (EGR) systems and sensor systems used with EGR systems.

Automobile vehicle engine control systems use multiple sensors to identify engine and vehicle operating characteristics during each vehicle operation. Rationality diagnostics are required for each sensor used on the vehicle to identify if the output from the sensor matches a predefined output range to confirm the sensor is operating properly. In engines having exhaust gas recirculation (EGR) systems a portion of exhaust flow is bypassed around the exhaust header and is routed to the intake manifold. Known EGR systems recover from vehicle deceleration fuel cut off (DFCO) events when excess oxygen is stored in a catalytic converter by running all of the engine cylinders rich after a load request is received following the DFCO event initiation. Air fuel sensors used in each output path from the engine cylinders must be rationalized to ensure the EGR system can be initiated. This diagnostic testing is intrusive as it requires power be provided to each sensor, and each sensor must pass the rationalization test.

Thus, while current EGR air fuel sensors achieve their intended purpose, there is a need for a new and improved system and method for reducing rationalization testing and reducing the quantity of air fuel sensors in an EGR system.

SUMMARY

According to several aspects, a method for operating an exhaust gas recirculation system using rationality diagnostics for an automobile vehicle includes: enabling a vehicle deceleration fuel cut off event recovery upon receipt of a signal from an engine controller of the automobile vehicle that fueling of an engine has stopped with the automobile vehicle decelerating with the engine operating; estimating an oxygen storage content (OSC) of a catalytic converter; comparing an amount of oxygen stored in the catalytic converter to an OSC threshold saved in a memory; and initiating a closed oxygen storage control (COSC) event if the OSC threshold is met or exceeded, the COSC event targeting a rich air-fuel equivalence ratio (EQR) for at least one of multiple cylinders of the engine.

In another aspect of the present disclosure, the method further includes determining if an exhaust gas recirculation (EGR) mode is authorized following initiation of the COSC event.

In another aspect of the present disclosure, the method further includes confirming if an engine load request has been received.

In another aspect of the present disclosure, the method further includes performing a query to determine if an EGR mode request has been made if the EGR mode is authorized and if the engine load request has been received.

In another aspect of the present disclosure, the method further includes if the EGR mode request has been made performing a ratification of a wide range air-flow (WRAF) sensor positioned in an exhaust bypass line upstream of an air inlet header and upstream of an EGR cooler to determine if the WRAF sensor is operating within predefined criteria.

In another aspect of the present disclosure, the method further includes generating an EGR mode enabled signal if the ratification of the WRAF sensor step has already been conducted during a current vehicle trip.

In another aspect of the present disclosure, the method further includes limiting performing the ratification to only once per vehicle trip.

In another aspect of the present disclosure, the method further includes if the EGR mode request has not been made operating the engine with all of the multiple cylinders rich for recovery from the COSC event.

In another aspect of the present disclosure, the method further includes if the ratification step of the WRAF sensor has not already been conducted during a current vehicle trip: configuring multiple EGR valves, including signaling an exhaust outlet valve to close and signaling an EGR isolation valve to open; and directing a fuel injector of a designated one of the multiple cylinders to operate the designated one of the multiple cylinders rich EQR, while multiple fuel injectors for remaining ones of the multiple cylinders are operated in a stoichiometric range.

In another aspect of the present disclosure, the method further includes performing the estimating step using signals received from an oxygen sensor and a mass air flow rate of the engine.

According to several aspects, a method for operating an exhaust gas recirculation system using rationality diagnostics for an automobile vehicle includes: estimating an oxygen storage content (OSC) of a catalytic converter of a vehicle; comparing an amount of oxygen stored in the catalytic converter to an OSC threshold; initiating a closed oxygen storage control (COSC) event for a predetermined one of multiple cylinders of an engine of a vehicle if the OSC threshold is met or exceeded, the COSC event targeting a rich air-fuel equivalence ratio (EQR) for the predetermined one of the multiple cylinders; and directing a fuel injector of the predetermined one of the multiple cylinders to operate the predetermined one of the multiple cylinders rich EQR.

In another aspect of the present disclosure, the method further includes positioning a first wide-range air-fuel (WRAF) sensor between a turbocharger and the catalytic converter to sense exhaust gas conditions including EQR richness of an air-fuel mixture in an exhaust gas discharged from the turbocharger. The first WRAF sensor can be located between the engine exhaust valves and the catalytic converter in a non-turbocharged application, and the turbocharger may be positioned between the first WRAF sensor and the catalytic converter.

In another aspect of the present disclosure, the method further includes performing a ratification of a second WRAF sensor positioned in an exhaust bypass line upstream of an air inlet header and upstream of an EGR cooler to determine if the second WRAF sensor is operating within predefined criteria prior to initiation of an exhaust gas recirculation (EGR) operation.

In another aspect of the present disclosure, the method further includes if the ratification of the second WRAF sensor has not already been conducted during a current vehicle trip configuring multiple EGR valves, and signaling an exhaust outlet valve to close and signaling an EGR isolation valve to open.

In another aspect of the present disclosure, the method further includes enabling a vehicle deceleration fuel cut off event recovery upon receipt of a signal from an engine controller of the vehicle that fueling of the engine has stopped with the vehicle decelerating with the engine operating wherein excess oxygen is being stored in the catalytic converter.

In another aspect of the present disclosure, the method further includes positioning the second WRAF sensor outside of a flow path of an oxygen sensor used for emissions control and outside of a flow path of the first WRAF sensor.

In another aspect of the present disclosure, the method further includes operating multiple fuel injectors for remaining ones of the multiple cylinders in a stoichiometric range.

According to several aspects, an exhaust gas recirculation system using rationality diagnostics for an automobile vehicle incudes a first wide-range air-fuel (WRAF) sensor positioned between a turbocharger and a catalytic converter of the automobile vehicle to sense exhaust gas conditions including an air-fuel equivalence ratio (EQR) richness in an exhaust gas discharged from the turbocharger. A second WRAF sensor is positioned in an exhaust bypass line upstream of an air inlet header and ratified to determine if the second WRAF sensor is operating within a predefined criteria as a pre-curser to initiation of an exhaust gas recirculation (EGR) operation. An amount of oxygen stored in the catalytic converter is compared to an OSC threshold and if the OSC threshold is met or exceeded a closed oxygen storage control (COSC) event is initiated for a predetermined one of multiple cylinders of an engine of the automobile vehicle. The COSC event targets a rich air-fuel equivalence ratio (EQR) for the predetermined one of the multiple cylinders. A fuel injector communicates with the predetermined one of the multiple cylinders operating the predetermined one of the multiple cylinders at the rich EQR.

In another aspect of the present disclosure, an exhaust gas recirculation cooler is positioned upstream of the second WRAF sensor cooling an exhaust gas contacting the second WRAF sensor so that a temperature of the exhaust gas contacting the second WRAF sensor is within a predetermined temperature range of a temperature of the exhaust gas contacting the first WRAF sensor.

In another aspect of the present disclosure, in a confirmation step a sampling of the first WRAF sensor identifies if a rich pulse has been received. An exhaust gas recirculation mode enabled signal is generated when the COSC event is complete.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
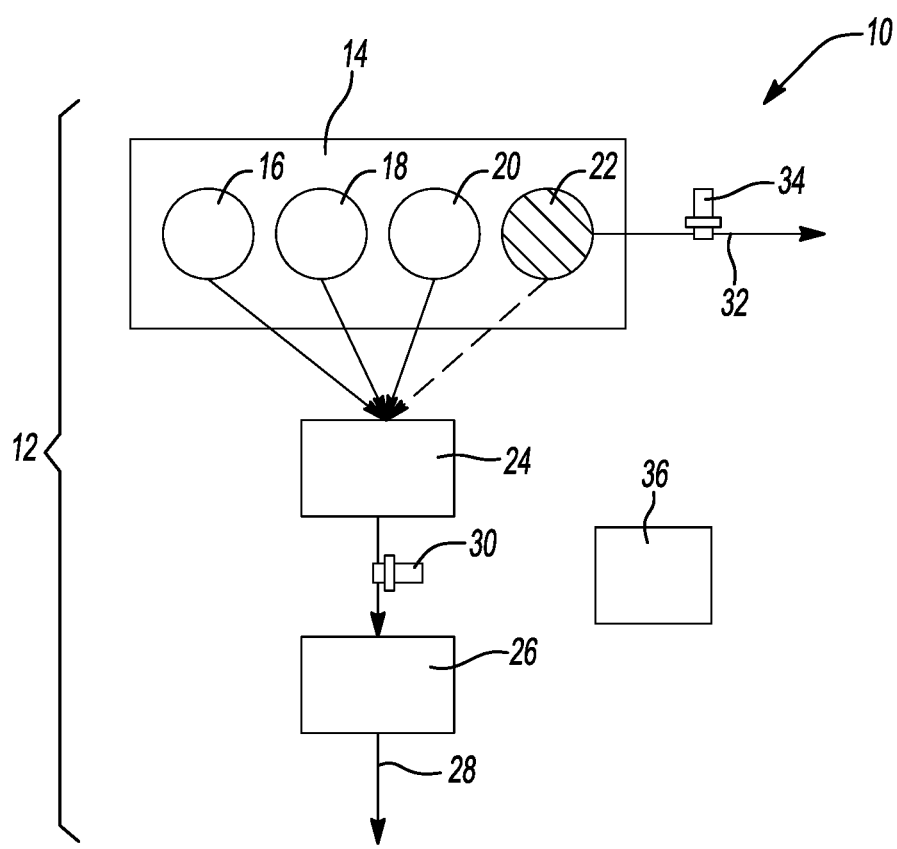
FIG. 1 is a diagrammatic presentation of an exhaust gas recirculation system with rationality diagnostics according to an exemplary aspect.
Figure 2:
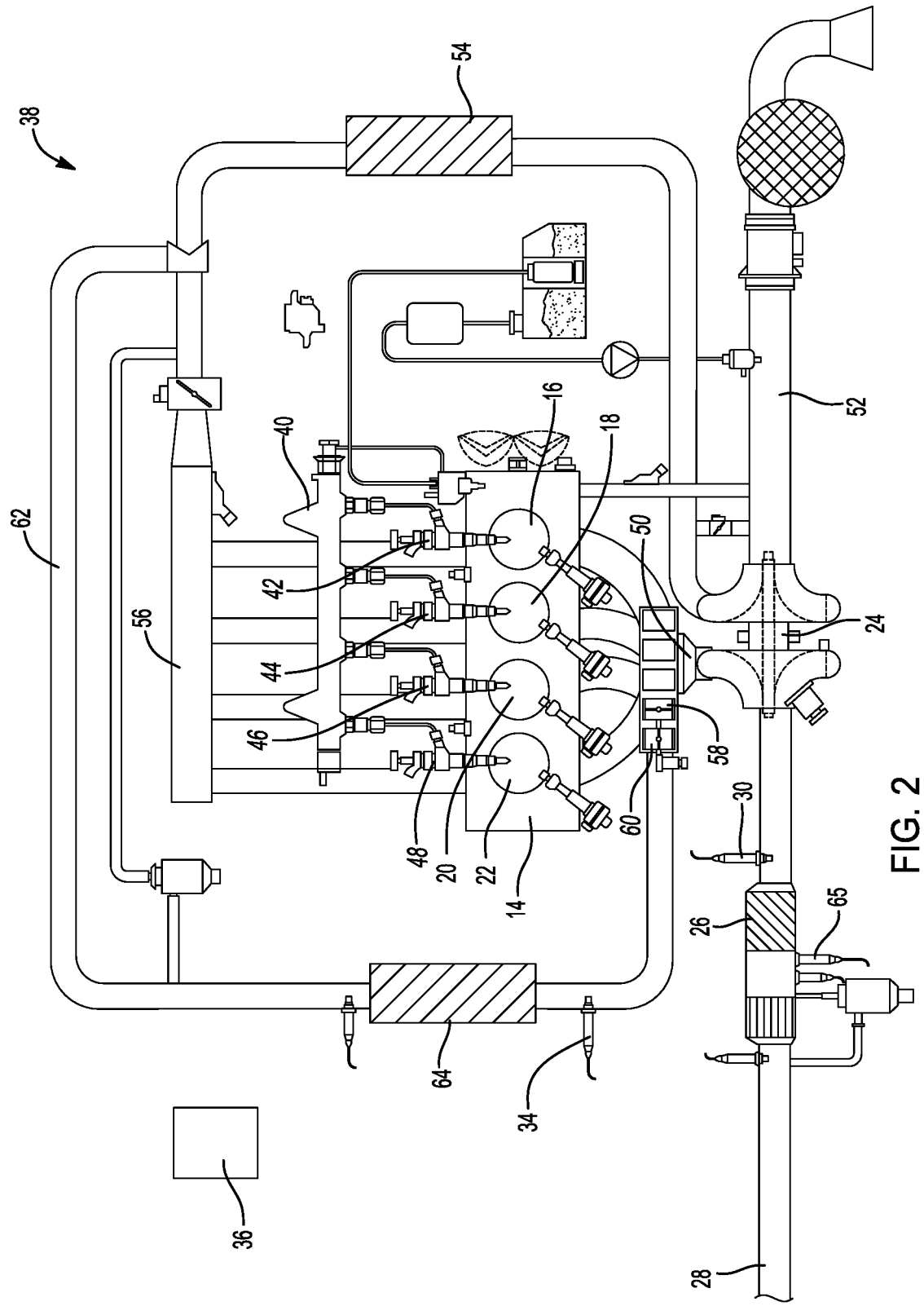
FIG. 2 is a diagrammatic presentation of an exhaust gas recirculation system incorporating the exhaust gas recirculation system with rationality diagnostics of FIG. 1.

Referring to FIG. 1, an exhaust gas recirculation system with rationality diagnostics 10 is provided for an automobile vehicle 12 having an engine 14. The engine 14 includes multiple cylinders, which according to an exemplary aspect shown include a first cylinder 16, a second cylinder 18, a third cylinder 20 and a fourth cylinder 22 defining a 4-cylinder engine configuration. It is noted the present disclosure is not limited to 4-cylinder engines and can be provided for 6-cylinder and 8-cylinder or other cylinder engines. An exhaust gas turbocharger 24 receives exhaust flow from at least the first cylinder 16, the second cylinder 18, and the third cylinder 20, and can further receive exhaust flow from the fourth cylinder 22 when an exhaust gas recirculation (EGR) system 38 described in greater detail in reference to FIG. 2 is not operational. The turbocharger 24 discharges exhaust gas into a catalytic converter 26 which then discharges treated exhaust gas to atmosphere through an exhaust system 28. A pre-catalyst first wide-range air-fuel (WRAF) sensor 30 is positioned between the turbocharger 24 and the catalytic converter 26 to sense exhaust gas conditions including how rich an air-fuel mixture is in the exhaust gas. The first WRAF sensor 30 produces an output signal that corresponds to an exact air/fuel ratio thereby providing a "linear" output because the first WRAF sensor 30 output changes in a smooth, predictable fashion. The first WRAF sensor 30 may be set to optimize sensitivity within a stoichiometric range of air fuel ratio. Signals from engine and other sensors (not shown) including the first WRAF sensor 30 and the second WRAF sensor 34 are forwarded to an engine controller 36 which makes determinations including if and when EGR system operation is authorized, and signals initiation or cessation of EGR system operation.

According to several aspects, the exhaust gas recirculation system with rationality diagnostics 10 includes a single cylinder directed EGR flow path 32, with all of the EGR flow coming from one of the cylinders, which according to several aspects is the fourth cylinder 22. Obtaining all of the EGR flow from only the fourth cylinder 22 can slow a speed of the flame burn in all four cylinders, therefore the reduced flame burn speed is mitigated by making the air-fuel mixture to the fourth cylinder rich upon initiation of EGR system operation. A rich air-fuel mixture generates hydrogen from fuel byproducts which increases the flame burn temperature and an ignition rate.

It has been determined that a second, wide range air fuel (WRAF) sensor 34 is required to control an air-fuel equivalence ratio (EQR) of the fuel rich fourth cylinder 22 due to sensitivity of the richness of the fourth cylinder 22 to the engine 14 combustion performance. The EQR is a ratio of an actual air fuel ratio to stoichiometry for a given fuel-air mixture. The EQR varies from 1.0 at stoichiometry to greater than 1.0 for a fuel rich mixture and to less than 1.0 for a fuel lean mixture. Incorporation of the second WRAF sensor 34 requires rationality diagnostics be performed to confirm acceptable operation of the second WRAF sensor 34 prior to initiation of EGR system operation. The second WRAF sensor 34 may be the same type of sensor as the first WRAF sensor 30, however the second WRAF sensor 34 may be set to optimize sensitivity within a rich range of air fuel ratio.

A vehicle deceleration fuel cut off (DFCO) event occurs as the vehicle 12 reduces speed for example when stopping or approaching a red light, and the engine 14 coasts while the engine 14 is running. Fuel is not burned during the DFCO event but the engine 14 continues to operate therefore air is pumped through the engine 14 providing oxygen to the catalytic converter 26 where the oxygen is stored. During the DFCO event, air which is lean or substantially devoid in fuel continues to be pumped through the engine 14 to the catalytic converter 26. The catalytic converter 26 actively stores oxygen (O2) and therefore needs required reductants to remove the stored O2 so that normal nitrogen oxide (NOx) conversion operation can be returned to after the DFCO event. A typical event which follows the DFCO event is a closed oxygen storage control (COSC) event which uses rich EQR targets on all of the cylinders to provide fuel based reductants to reduce the stored O2 in the catalytic converter 26 to thereby reestablish NOx control. A COSC strategy of the present disclosure targets a rich EQR for just one of the cylinders, for example the fourth cylinder 22, in line with O2 reduction strategies for emissions controls. The second WRAF sensor 34 which is not in the same flow path as an O2 sensor 65 used for emissions control or the first WRAF sensor 30 is therefore rationalized prior to initiation of EGR system operation to ensure the second WRAF sensor 34 is operating properly to distinguish the AFR for the level of richness of the designated EGR cylinder, cylinder 22.

The exhaust gas recirculation system with rationality diagnostics 10 rationalizes the second WRAF sensor 34 for rich EQR control of the reduced or controlled number of cylinders that are providing their exhaust and reformate to all cylinders to increase efficiency. This rationality requires the second WRAF sensor 34 to determine the fuel air ratio of the fuel rich fourth cylinder 22 which is different from the first WRAF sensor 30 used to determine the fuel air ratio of all of the cylinders to an emissions control device.

Referring to FIG. 2 and again to FIG. 1, an exemplary configuration for an EGR system 38 of the present disclosure includes a fuel rail 40 which delivers fuel to individual fuel injectors, including a first fuel injector 42 in communication with the first cylinder 16, a second fuel injector 44 in communication with the second cylinder 18, a third fuel injector 46 in communication with the third cylinder 20 and a fourth fuel injector 48 in communication with the fourth cylinder 22. During non-EGR system operation, exhaust gas from each of the cylinders is discharged into an exhaust header 50 which discharges into the turbocharger 24. Rotation of the turbocharger 24 draws air through an air intake line 52 into a compressor of the turbocharger 24, which compresses the air and discharges compressed air through a charge-air-cooler 54 for delivery of compressed, cooled air into an air inlet header 56 which is then individually delivered to each of the cylinders.

When operation of the EGR system 38 is desired, the engine controller 36 signals an exhaust outlet valve 58 to close which blocks exhaust discharged from the fourth cylinder 22 from entering the exhaust header 50. At the same time the engine controller 36 signals an EGR isolation valve 60 to open which directs exhaust gas from the fourth cylinder 22 to enter an exhaust bypass line 62 upstream of the air inlet header 56. Exhaust gas from the fourth cylinder 22 is cooled by being directed into an EGR cooler 64 before entering the air inlet header 56. According to several aspects, the second WRAF sensor 34 is positioned upstream of the EGR cooler 64 so that temperature conditions of the exhaust gas contacting the second WRAF sensor 34 are similar to temperature conditions of the exhaust gas contacting the first WRAF sensor 30. According to several aspects, an oxygen sensor 65 is provided whose output signal equates to oxygen level of the catalytic converter 26.

Figure 3:
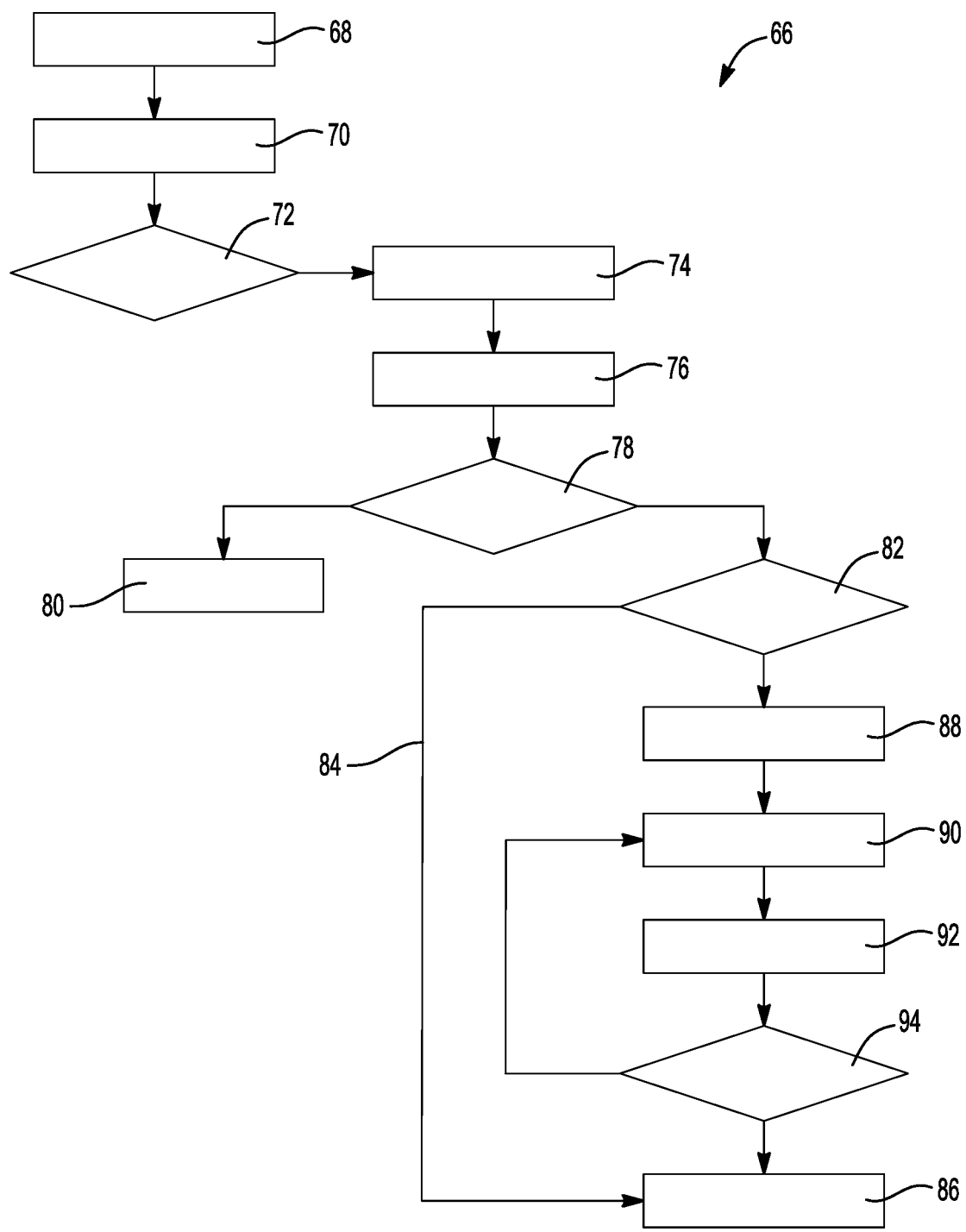
FIG. 3 is a flow chart of operational steps for the exhaust gas recirculation system with rationality diagnostics of FIG. 1.

Prior to initial operation of the EGR system 38 for each vehicle trip, defined as a start-stop operation window, the second WRAF sensor 34 requires rationality diagnostics be performed to confirm acceptable operation of the second WRAF sensor 34. The steps performed during this rationality testing are described in reference to FIG. 3 herein. To minimize hardware required the exhaust gas recirculation system with rationality diagnostics 10 limits intrusiveness of the rationality test by providing a fuel neutral technique to verify the system is in control. The second WRAF sensor 34 determines a fuel air ratio of the rich cylinder 22 and this sensor output is compared to the output of the first WRAF sensor 30 which identifies an average air fuel ratio of the remaining cylinders. If the output of the second WRAF sensor 34 is within a predetermined range or threshold, the second WRAF sensor 34 is deemed to be operating correctly, and EGR system 38 operation having a single rich cylinder is permitted.

In order to quickly recover the ability of the catalytic converter 26 following a DFCO event, one of the cylinders, which according to several aspects is the fourth cylinder 22 is operated fuel rich by control signals sent from the engine controller 36 to the fourth fuel injector 48. The fourth fuel injector 48 is therefore operated to deliver more fuel at a higher fuel to air ratio than any of the first fuel injector 42, the second fuel injector 44 and the third fuel injector 46. Where known operation of an EGR system utilizes substantially equal flow of fuel to each cylinder, each cylinder may be operated approximately 5% rich. In contrast, the exhaust gas recirculation system with rationality diagnostics 10 operates only one of the cylinders rich, for example the fourth cylinder 22, and therefore raises the fuel to air mixture to the fourth cylinder 22 to approximately 20% rich. By varying control of the fourth fuel injector 48, a range of rich operation of the fourth cylinder 22 can also be varied between approximately 15% rich up to approximately 35% rich.

Referring to FIG. 3 and again to FIG. 2, a methodology flow chart 66 defines steps for operation of the exhaust gas recirculation system with rationality diagnostics 10. In an enablement step 68 a signal is received by the engine controller 36 that engine fueling has stopped with the vehicle decelerating and the engine 14 operating, and a DFCO event recovery is enabled. In an estimation step 70 an estimate of an oxygen storage content (OSC) of the catalytic converter 26 is calculated using signals received from the oxygen sensor 65 described in reference to FIG. 2 and a mass air flow rate of the engine 14. In a following comparison step 72 an amount of oxygen stored in the catalytic converter 26 is compared to an OSC threshold saved in a memory. In an enablement step 74 if the OSC threshold is met or exceeded, a COSC event for the fourth cylinder 22 is enabled which targets a rich EQR for just the fourth cylinder 22.

Following initiation of the COSC event in the enablement step 74, in an authorization step 76 a determination is made if EGR mode is authorized. During the authorization step 76 a determination is also performed to confirm if an engine load request has been received. If EGR mode is authorized and if an engine load request has been received, in a request step 78 a query is performed to determine if an EGR mode request has been made. If no EGR mode request has been made in an all-cylinder step 80 the engine 14 is operated with all cylinders rich for the COSC event recovery. If an EGR mode request has been made in a ratification step 82 a ratification of the second WRAF sensor 34 is performed to determine if the second WRAF sensor 34 is operating within predetermined criteria. The ratification step 82 is conducted only once per vehicle trip as defined herein. If the ratification step 82 has already been conducted during the current vehicle trip an EGR mode enabled signal 86 is generated.

If the ratification step 82 has not already been conducted during the current vehicle trip, in a configuration step 88 the EGR valves are configured, including signaling the exhaust outlet valve 58 to close and signaling the EGR isolation valve 60 to open. In an operation step 90 the fourth fuel injector 48 is directed to operate the fourth cylinder 22 rich EQR, while the fuel injectors for the remaining cylinders are operated such that the remaining cylinders are maintained at stoichiometry. In a confirmation step 92 the first WRAF sensor 30 is sampled to identify if a rich pulse has been received. In a completion determination step 94 a determination is made if the COSC event is complete and if the COSC event is not complete, the operation step 90 is repeated. If a result of the completion determination step 94 identifies the COSC event is complete the EGR mode enabled signal 86 is generated.

A method for operating an exhaust gas recirculation system with rationality diagnostics of the present disclosure offers several advantages. These include a method that limits intrusiveness of an intrusive test of an air fuel sensor by providing a fuel neutral technique to verify the system is in control. The exhaust gas recirculation system with rationality diagnostics of the present disclosure also provides rationality testing to be used to confirm an EGR system which operates with only one of the cylinders rich can be initiated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for operating an exhaust gas recirculation system using rationality diagnostics for an automobile vehicle, comprising:
    enabling a vehicle deceleration fuel cut off event recovery upon receipt of a signal from an engine controller of the automobile vehicle that fueling of an engine has stopped with the automobile vehicle decelerating with the engine operating;
    estimating an oxygen storage content (OSC) of a catalytic converter;
    comparing an amount of oxygen stored in the catalytic converter to an OSC threshold saved in a memory;
    initiating a closed oxygen storage control (COSC) event if the OSC threshold is met or exceeded, the COSC event targeting a rich air-fuel equivalence ratio (EQR) for at least one of multiple cylinders of the engine;
    determining if an exhaust gas recirculation (EGR) mode is authorized following initiation of the COSC event; and
    confirming if an engine load request has been received; and
    wherein if the EGR mode is authorized and if the engine load request has been received performing a query to determine if an EGR mode request has been made; and
    wherein if the EGR mode request has been made, performing a ratification of a wide range air-flow (WRAF) sensor positioned in an exhaust bypass line upstream of an air inlet header and upstream of an EGR cooler to determine if the WRAF sensor is operating within a predefined criteria.

2. The method for operating the exhaust gas recirculation system using rationality diagnostics of claim 1, wherein if the EGR mode request has not been made further including operating the engine with all of the multiple cylinders rich for recovery from the COSC event.

3. The method for operating the exhaust gas recirculation system using rationality diagnostics of claim 1, further including limiting performing the ratification of the WRAF sensor to once per a current vehicle trip.

4. The method for operating the exhaust gas recirculation system using rationality diagnostics of claim 3, further including generating an EGR mode enabled signal following completion of the ratification of the WRAF sensor during the current vehicle trip.

5. The method for operating the exhaust gas recirculation system using rationality diagnostics of claim 1, further including:
    configuring multiple EGR valves, including signaling an exhaust outlet valve to close and signaling an EGR isolation valve to open; and
    directing a fuel injector of a designated one of the multiple cylinders to operate the designated one of the multiple cylinders rich EQR, while multiple fuel injectors for remaining ones of the multiple cylinders are operated in a stoichiometric range.

6. The method for operating the exhaust gas recirculation system using rationality diagnostics of claim 1, further including using signals received from an oxygen sensor and a mass air flow rate of the engine when estimating the OSC of the catalytic converter.

7. A method for operating an exhaust gas recirculation system using rationality diagnostics for an automobile vehicle, comprising:
    estimating an oxygen storage content (OSC) of a catalytic converter of the automobile vehicle;
    comparing an amount of oxygen stored in the catalytic converter to an OSC threshold;
    initiating a closed oxygen storage control (COSC) event for a predetermined one of multiple cylinders of an engine of the automobile vehicle if the OSC threshold is met or exceeded, the COSC event targeting a rich air-fuel equivalence ratio (EQR) for the predetermined one of the multiple cylinders;
    directing a fuel injector communicating with the predetermined one of the multiple cylinders to operate the predetermined one of the multiple cylinders at the rich EQR; and
    positioning a first wide-range air-fuel (WRAF) sensor between a turbocharger and the catalytic converter to sense exhaust gas conditions including EQR richness of an air-fuel mixture in an exhaust gas discharged from the turbocharger.

8. The method for operating the exhaust gas recirculation system using rationality diagnostics of claim 7, further including performing a ratification of a second WRAF sensor positioned in an exhaust bypass line upstream of an air inlet header and upstream of an EGR cooler to determine if the second WRAF sensor is operating within a predefined criteria prior to initiation of an exhaust gas recirculation (EGR) operation.

9. The method for operating the exhaust gas recirculation system using rationality diagnostics of claim 8, further including if the ratification of the second WRAF sensor has not already been conducted during a current vehicle trip configuring multiple EGR valves, including signaling an exhaust outlet valve to close and signaling an EGR isolation valve to open.

10. The method for operating the exhaust gas recirculation system using rationality diagnostics of claim 8, further including positioning the second WRAF sensor outside of a first flow path of an oxygen sensor used for emissions control and outside of a second flow path of the first WRAF sensor.

11. The method for operating the exhaust gas recirculation system using rationality diagnostics of claim 7, further including enabling a vehicle deceleration fuel cut off event recovery upon receipt of a signal from an engine controller of the vehicle that fueling of the engine has stopped with the vehicle decelerating with the engine operating wherein excess oxygen is being stored in the catalytic converter.

12. The method for operating the exhaust gas recirculation system using rationality diagnostics of claim 7, further including operating multiple fuel injectors in communication with the multiple cylinders other than the predetermined one of the multiple cylinders in a stoichiometric range.

13. An exhaust gas recirculation system using rationality diagnostics for an automobile vehicle, comprising:
   a first wide-range air-fuel (WRAF) sensor positioned between a turbocharger and a catalytic converter of the automobile vehicle to sense exhaust gas conditions including an air-fuel equivalence ratio (EQR) richness in an exhaust gas discharged from the turbocharger;
   a second WRAF sensor positioned in an exhaust bypass line upstream of an air inlet header ratified to determine if the second WRAF sensor is operating within a predefined criteria as a pre-curser to initiation of an exhaust gas recirculation (EGR) operation;
   an amount of oxygen stored in the catalytic converter is compared to an OSC threshold and if the OSC threshold is met or exceeded a closed oxygen storage control (COSC) event is initiated for a predetermined one of multiple cylinders of an engine of the automobile vehicle, the COSC event targeting a rich air-fuel equivalence ratio (EQR) for the predetermined one of the multiple cylinders; and
   a fuel injector communicating with the predetermined one of the multiple cylinders operating the predetermined one of the multiple cylinders at the rich EQR.

14. The exhaust gas recirculation system using rationality diagnostics of claim 13, further including an exhaust gas recirculation cooler positioned upstream of the second WRAF sensor cooling an exhaust gas contacting the second WRAF sensor so that a temperature of the exhaust gas contacting the second WRAF sensor is within a predetermined temperature range of a temperature of the exhaust gas contacting the first WRAF sensor.

15. The exhaust gas recirculation system using rationality diagnostics of claim 13, further including:
   in a confirmation step a sampling of the first WRAF sensor identifies if a rich pulse has been received; and
   an exhaust gas recirculation mode enabled signal generated when the COSC event is complete.

* * * * *